US010184597B2

(12) United States Patent
Freed et al.

(10) Patent No.: US 10,184,597 B2
(45) Date of Patent: Jan. 22, 2019

(54) STRESS REDUCING THREAD FORM (71) Applicant: FORUM US, INC., Houston, TX (US)

(72) Inventors: Wesley Freed, Aledo, TX (US); Mark C. Dille, Houston, TX (US)

(73) Assignee: FORUM US, INC, Houston, TX (US)

( * ) Notice: Subject to any disclaimer, the term of this patent is extended or adjusted under 35 U.S.C. 154(b) by 41 days.

(21) Appl. No.: 15/292,364

(22) Filed: Oct. 13, 2016

(65) Prior Publication Data
US 2018/0106399 A1   Apr. 19, 2018

(51) Int. Cl.
*F16B 33/00* (2006.01)
*F16L 15/06* (2006.01)
*E21B 17/042* (2006.01)
*F16L 15/00* (2006.01)

(52) U.S. Cl.
CPC ............ *F16L 15/06* (2013.01); *E21B 17/042* (2013.01); *E21B 17/0423* (2013.01); *F16B 33/00* (2013.01); *F16L 15/006* (2013.01)

(58) Field of Classification Search
CPC ...... F16B 25/0042; F16B 33/00; F16B 33/02; F16B 15/06; E21B 17/042
USPC .......................... 411/366.1, 366.3, 411, 436
See application file for complete search history.

(56) References Cited

U.S. PATENT DOCUMENTS

| | | | | |
|---|---|---|---|---|
| 2,371,365 A | * | 3/1945 | Tomalis | B21H 3/025 411/310 |
| 2,681,815 A | * | 6/1954 | McCarn | F16L 15/001 285/333 |
| 3,799,229 A | * | 3/1974 | Johnson | F16B 39/30 411/307 |
| 4,157,725 A | * | 6/1979 | Stanaitis | F16B 43/00 411/147 |
| 4,326,825 A | * | 4/1982 | Volkmann | F16B 4/004 411/361 |
| 4,549,754 A | * | 10/1985 | Saunders | E21B 17/042 285/334 |
| 5,092,635 A | | 3/1992 | DeLange et al. | |
| 5,127,784 A | | 7/1992 | Eslinger | |
| 7,416,374 B2 | * | 8/2008 | Breihan | F16B 33/02 285/334 |
| 7,490,394 B2 | | 2/2009 | Zakrzewski | |
| 7,731,466 B2 | * | 6/2010 | Shea | F16B 39/30 411/308 |
| 7,997,842 B2 | * | 8/2011 | Diekmeyer | B01D 27/00 411/366.1 |
| 8,061,946 B2 | * | 11/2011 | Komine | F16B 33/02 411/366.3 |

(Continued)

FOREIGN PATENT DOCUMENTS

| | | |
|---|---|---|
| CA | 2514759 A1 | 8/2004 |
| CN | 104373056 A | 2/2015 |

(Continued)

OTHER PUBLICATIONS

International Search Report and Written Opinion dated Dec. 13, 2017, corresponding to Application No. PCT/US2017/053510.

*Primary Examiner* — Roberta S Delisle (74) *Attorney, Agent, or Firm* — Patterson + Sheridan LLP (57) ABSTRACT

A thread form for a threaded connection comprising a plurality of threads, wherein at least a portion of each of the threads comprise a root having a root radius that extends from a point central to the root and having planar flanks extending from both sides thereof.

17 Claims, 7 Drawing Sheets

(56) References Cited

U.S. PATENT DOCUMENTS

| | | | |
|---|---|---|---|
| 8,668,232 B2 | 3/2014 | Mazzaferro et al. | |
| 8,671,547 B2 * | 3/2014 | Matsubayashi | F16B 39/30 29/525.01 |
| 8,882,425 B2 * | 11/2014 | Benjamin | F16B 33/02 411/116 |
| 2005/0161259 A1 | 7/2005 | Kaul | |
| 2010/0018699 A1 | 1/2010 | Hall et al. | |
| 2011/0033263 A1 * | 2/2011 | Matsubayashi | F16B 39/30 411/366.1 |
| 2016/0032663 A1 | 2/2016 | Benedict | |

FOREIGN PATENT DOCUMENTS

| | | | |
|---|---|---|---|
| EP | 1705415 A2 | 9/2006 | |
| WO | 2015191940 A1 | 12/2015 | |

* cited by examiner

STRESS REDUCING THREAD FORM

BACKGROUND

Field

Embodiments disclosed herein relate to a thread form for coupling and de-coupling threaded connections. More specifically, embodiments disclosed herein relate to a thread form that reduces stress and improves fatigue life of threaded connections that experience cyclical and/or vibrational loading.

Description of the Related Art

Threaded connections are widely used in the oil and gas industry to couple one or more devices together. These types of thread connections often experience significant vibrational forces and/or significant cyclical loading. One example includes high pressure reciprocating pumps, such as multiplex plunger pumps. These types of pumps have a fluid end that includes valves, plungers, liners, among other components, that is driven by a power end that converts the rotation of a drive shaft to the reciprocating motion of a plunger in the fluid end. These types of pumps can pump fluids into a wellbore at rates of up to 10 barrels per minute and at pressures up to 20,000 pounds per square inch (psi).

A fluid end typically includes three or more plunger bores. Each plunger bore houses a reciprocating plunger. The reciprocating plunger is coupled to the fluid end by a packing nut that includes male threads that interface with female threads of the fluid end. Typically, the male/female threads are of the same type or style. The thread interface of the male/female threads experiences shear forces in a cyclic manner when the fluid end is in operation. In particular, the threads are stressed along a shear plane that is substantially parallel to the longitudinal axis of the threads during operation of the fluid end, which causes fatigue and ultimately failure of the threaded interface. Additionally or alternatively, the threaded interface may experience vibrational forces which may cause loosening as well as premature failure of the connection.

Therefore, there exists a need for a new and improved threaded interface that prevents the failure described above.

SUMMARY

In one embodiment, a thread form for a threaded connection is provided and includes a plurality of threads, wherein at least a portion of each of the threads comprise a root having a root radius that extends from a point central to the root and having planar flanks extending from both sides thereof.

In one embodiment, a threaded connection is provided and includes a male thread form, and a female thread form that is different than the male thread form, wherein the female thread form includes a root having a root radius that extends from a central point to the root and planar flanks extending from both sides of the root radius.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

The embodiments of the disclosure overcome the drawbacks of conventional threaded connections. In a conventional threaded connection, the male and female thread forms are the same or similar, which results in large shear stress along the longitudinal axis of the threaded connection when subjected to a cyclic tensile force. Such large shear stress often causes the threaded connection to break at the root of the threads when fatigued. Additionally, the male and female thread forms of a conventional threaded connection fit tightly together, which causes galling and/or hydro-locking.

Embodiments of the disclosure include a stress relieving thread form. Embodiments of the disclosure include a thread form with an improved fatigue life that may be utilized in cyclic loading scenarios, such as with high pressure reciprocating pumps used in the oil and gas industry. Embodiments of the disclosure include a threaded connection comprising a male thread form having a profile that interfaces with a profile of a female thread form, where the profiles are different and configured to reduce stress within the threaded connection. Embodiments of the thread forms described herein also resist loosening from vibrational forces as compared to conventional thread forms.

Although the embodiments of the thread forms described herein are directed to a threaded connection of a multiplex plunger pump, the thread forms may be used as a threaded connection for any other types of devices. The embodiments described herein of a female thread form may be used with any type of male thread. The embodiments described herein of a female thread form may also be used as a male thread form and vice versa.

Figure 1A:
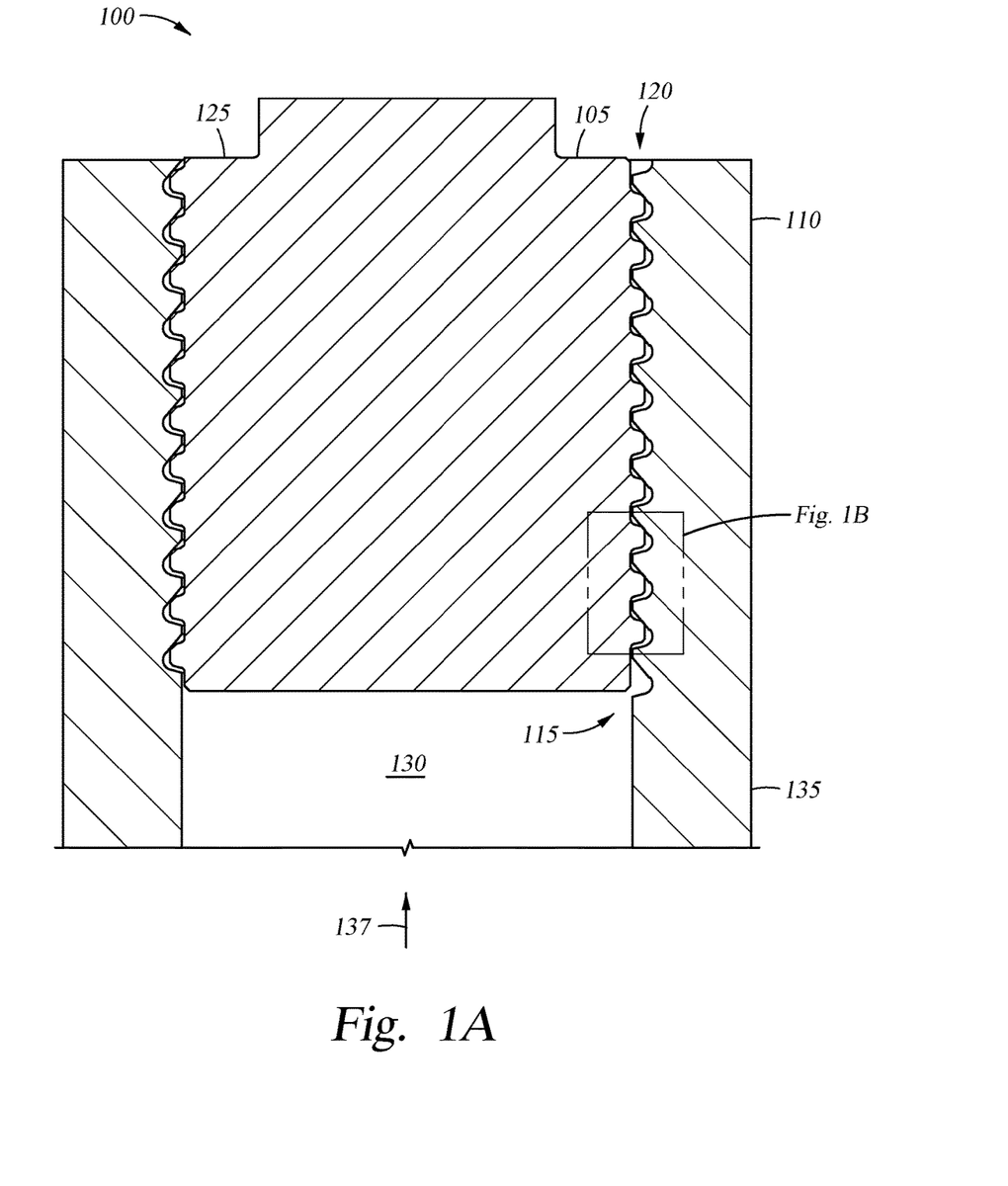
FIG. 1A is a cross-sectional view of one embodiment of a threaded connection.

FIG. 1A is a cross-sectional view of one embodiment of a threaded connection 100. The threaded connection 100 includes a male portion 105 and a female portion 110. The male portion 105 includes a male thread form 115, and the female portion 110 includes a female thread form 120. In one embodiment, the male portion 105 of the threaded connection 100 may form part of a packing nut 125 that is threaded into the female portion 110 of a plunger bore 130 of a multiplex plunger pump 135.

During operation of the multiplex plunger pump 135, a force (indicated by reference arrow 137) acts upon the threaded connection 100 as pressurized fluid is pumped into and out of the multiplex plunger pump 135. The force is cyclic as pressure within the multiplex plunger pump 135 repeatedly fluctuates from about 0 psi to about 20,000 psi. The cyclic force stresses and fatigues the threaded connection 100.

Figure 1B:
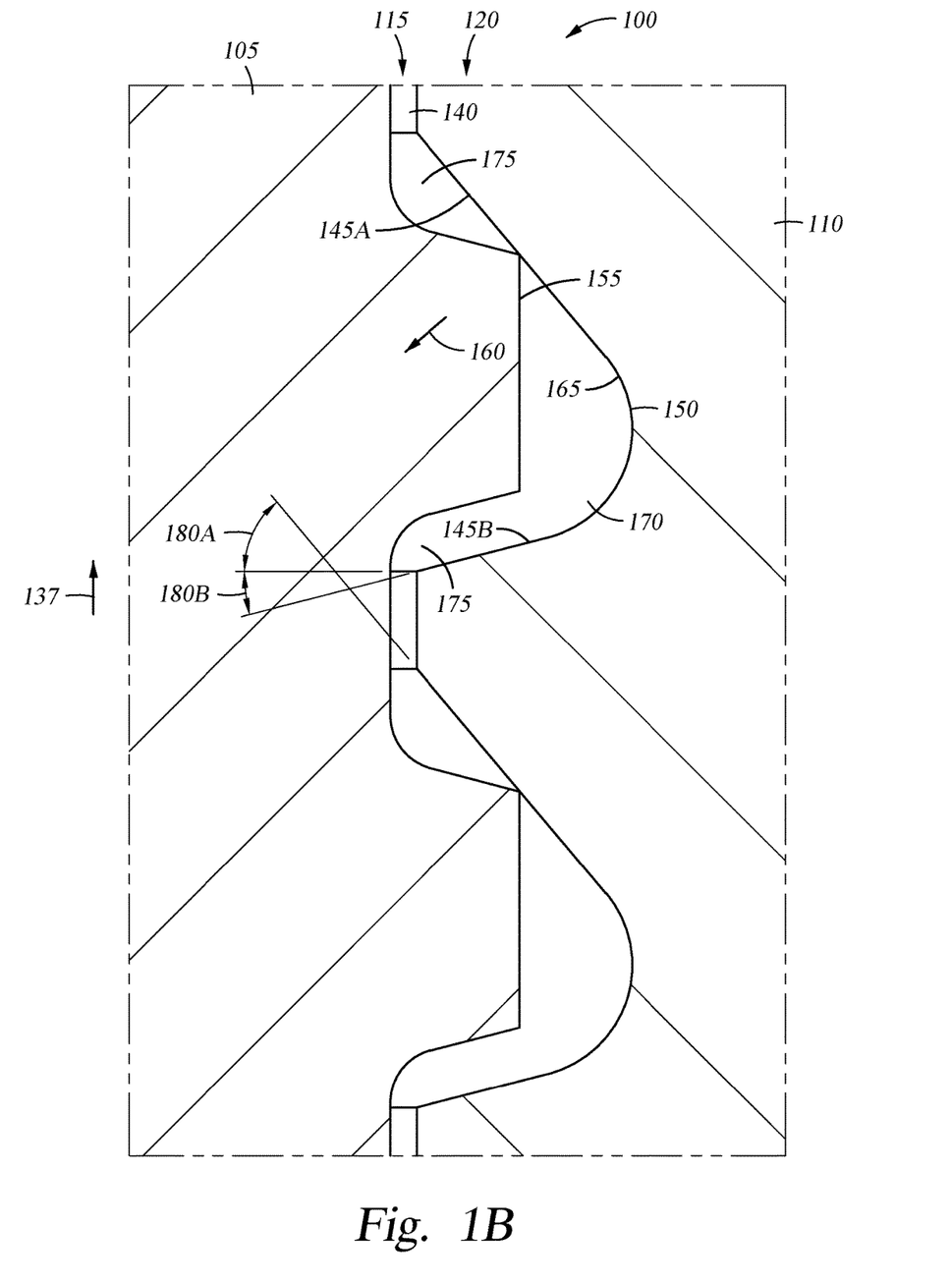
FIG. 1B is an enlarged view of a portion of the cross-sectional view of the threaded connection of FIG. 1A.

FIG. 1B is an enlarged view of a portion of the cross-sectional view of the threaded connection 100 of FIG. 1A. In this embodiment, the male thread form 115 is an Acme thread type. The female thread form 120 includes a crest 140, flanks 145A, 145B and a root 150. The flank 145A contacts an edge of a crest 155 of the male thread form 115 when the threaded connection 100 is made up.

The contact between the flank 145A and the edge of the crest 155 helps reduce the shear stress applied to the threaded connection 100 when subjected to a tensile force. In particular, when a force (as indicated by reference arrow 137) is applied to the threaded connection 100, the resulting stress vector (as indicated by reference arrow 160) is directed inward and at an angle relative to the longitudinal axis of the male portion 105. The amount of shear stress applied in the longitudinal direction to the threaded connection 100 is thereby reduced when compared to conventional threaded connections.

The female thread form 120 of the threaded connection 100 is the only thread that is modified according to this embodiment, and the female thread form 120 allows for the use of standard threads on the male portion 105. The female thread form 120 redirects shear forces such that fatigue on the threaded connection 100 is reduced. Additionally, the female thread form 120 includes a root radius 165 that is curved instead of a flat root radius as used in conventional thread forms.

The root 150 of the female thread form 120 incudes the root radius 165 that interfaces with each flank 145A, 145B which are planar or flat. The root radius 165 provides a large gap 170 between the apex of the root 150 and the crest 155 of the male thread form 115. Additionally, gaps 175 are formed between surfaces of each flank 145A, 145B, and surfaces of the male thread form 115. The gaps 170, 175 provide an increased area or volume around the thread contact surfaces for grease, dirt, and other foreign debris migration, thus reducing the likelihood of galling and/or hydro-locking.

The flanks 145A, 145B of the female thread form 120 are positioned at angles that differ from each other. The first flank 145A is formed in a first angle 180A, and the second flank 145B is formed in a second angle 180B. In one embodiment, the first angle 180A is greater than the second angle 180B, such as by about 50% to about 100%. In one embodiment, the first angle 180A is about 14 degrees (or within a range of about 14 degrees to about 15 degrees) and the second angle 180B is about 50 degrees.

Figure 2A:
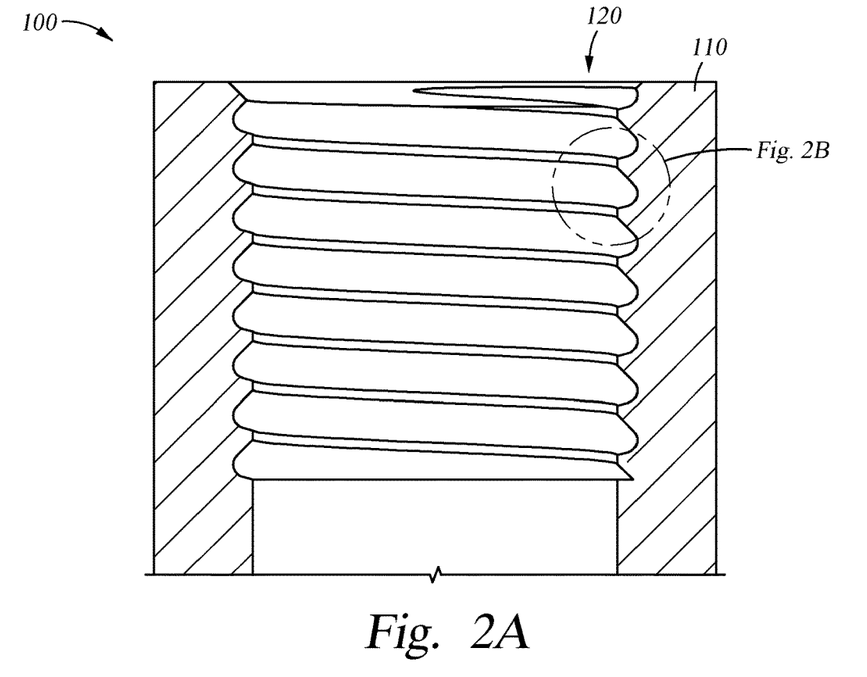
FIG. 2A is a cross-sectional view of a female portion of the threaded connection shown in FIGS. 1A and 1B.
Figure 2B:
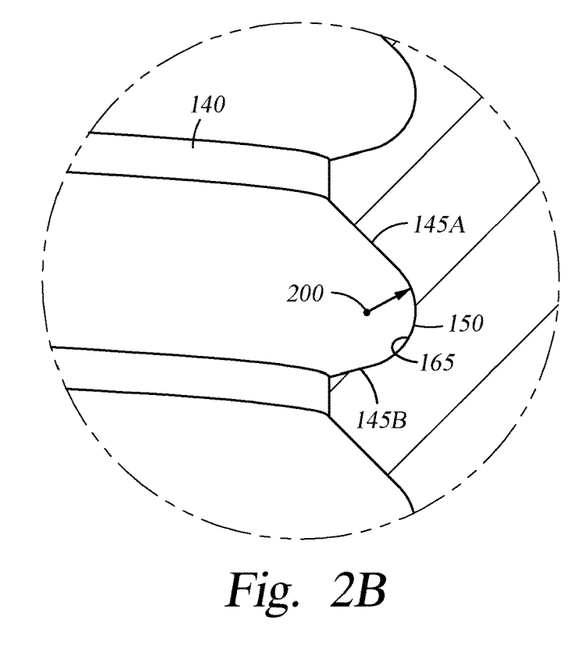
FIG. 2B is an enlarged view of a portion of the cross-sectional view of the female portion of the threaded connection shown in FIG. 2A.

FIG. 2A is a cross-sectional view of the female portion 110 of the threaded connection 100 shown in FIGS. 1A and 1B without the male portion 105 to show the female thread form 120 more clearly. FIG. 2B is an enlarged view of a portion of the cross-sectional view of the female portion 110 of FIG. 2A. Clearly shown are the flanks 145A, 145B, the crest 140, and the root radius 165. The root radius 165 may extend from a point 200 that is central to the root 150.

The female thread form 120 may have a pitch within a range of about 2 to about 20 threads per inch. The nominal diameter of the female thread form 120 may be between about 0.25 inches to about 15 inches.

FIGS. 3A-3B, 4A-4B, 5A-5B, and 6A-6B, respectively, are cross-sectional views of male portions that may be threaded into the female portion 110 having the female thread form 120 shown in FIGS. 2A and 2B to form the threaded connection of FIGS. 1A and 1B.

Figure 3A:
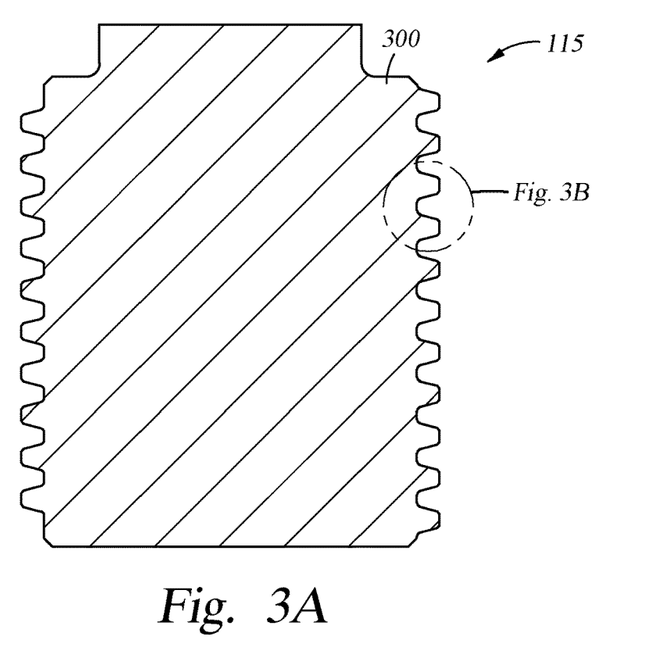
FIGS. 3A, 3B, 4A, 4B, 5A, 5B, 6A, and 6B, respectively, are cross-sectional views of male portions that may be utilized with the female portion shown in FIGS. 2A and 2B to form the threaded connection shown in FIGS. 1A and 1B.
Figure 3B:
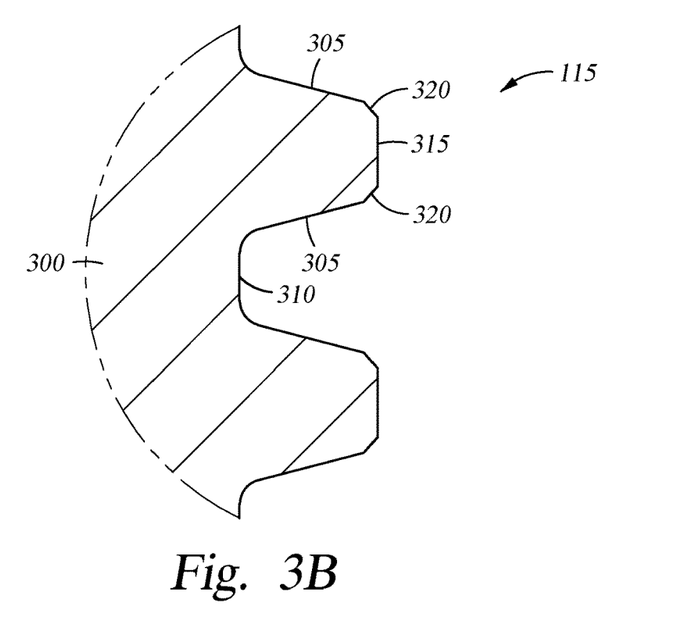

FIG. 3A is a cross-sectional view of a male portion 300 having a male thread form 115 that is an Acme thread type (which may also include Acme stub and Acme stub "M1" thread types). FIG. 3B is an enlarged portion of the cross-sectional view of the male thread form 115 of FIG. 3A. As shown in FIG. 3B, the male thread form 115 includes flanks 305, a flat root 310, and a crest 315 having chamfered edges 320. The male thread form 115 of the male portion 300 may be utilized with the female thread form 120 of the female portion 110 to form the threaded connection 100 of FIGS. 1A and 1B. The flanks 305 are disposed at the same angle with respect to a plane of the root 310 and/or the crest 315, and intersect the chamfered edges 320.

Figure 4A:
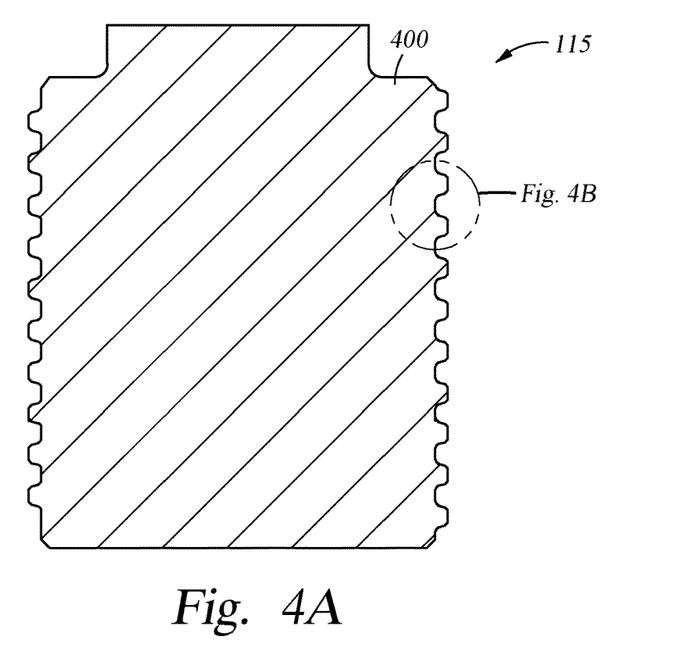
Figure 4B:
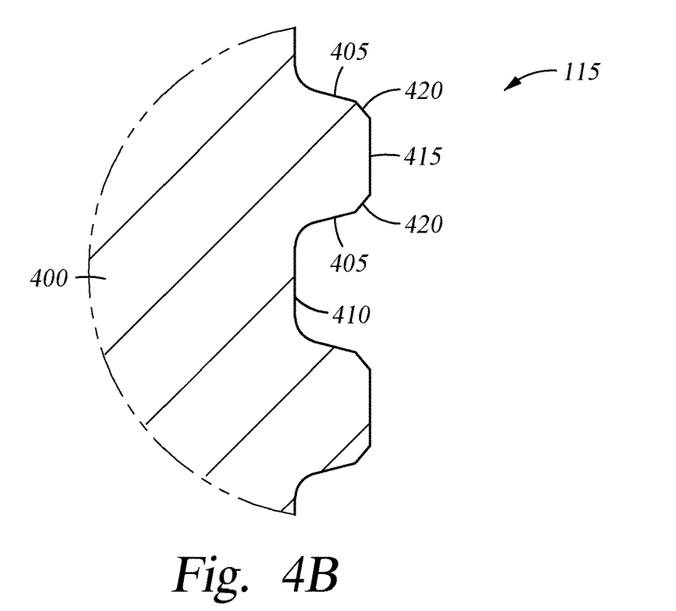

FIG. 4A is a cross-sectional view of a male portion 400 having a male thread form 115 that is an Acme stub "M2" thread type. FIG. 4B is an enlarged portion of the cross-sectional view of the male thread form 115 of FIG. 4A. As shown in FIG. 4B, the male thread form 115 includes flanks 405, a flat root 410, and a crest 415 having chamfered edges 420. The male thread form 115 of the male portion 400 may be utilized with the female thread form 120 of the female portion 110 to form the threaded connection 100 of FIGS. 1A and 1B. The flanks 405 are disposed at the same angle with respect to a plane of the root 410 and/or the crest 415, and intersect the chamfered edges 420.

Figure 5A:
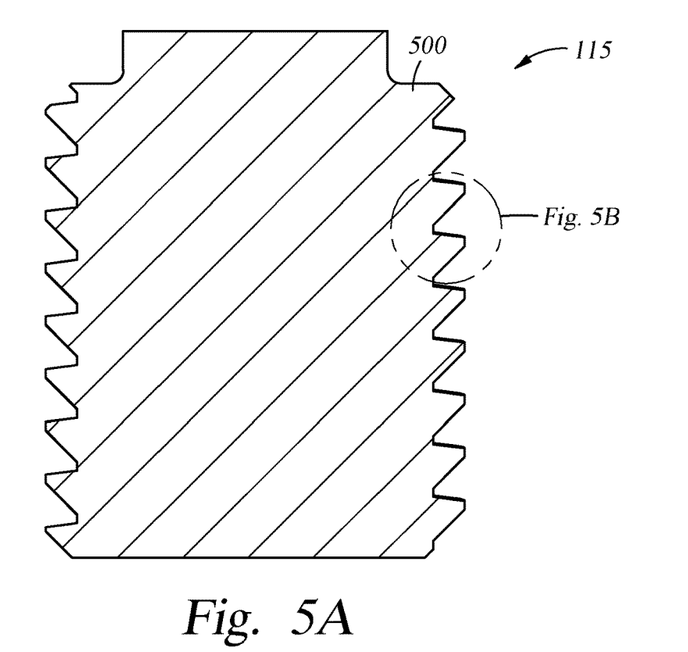
Figure 5B:
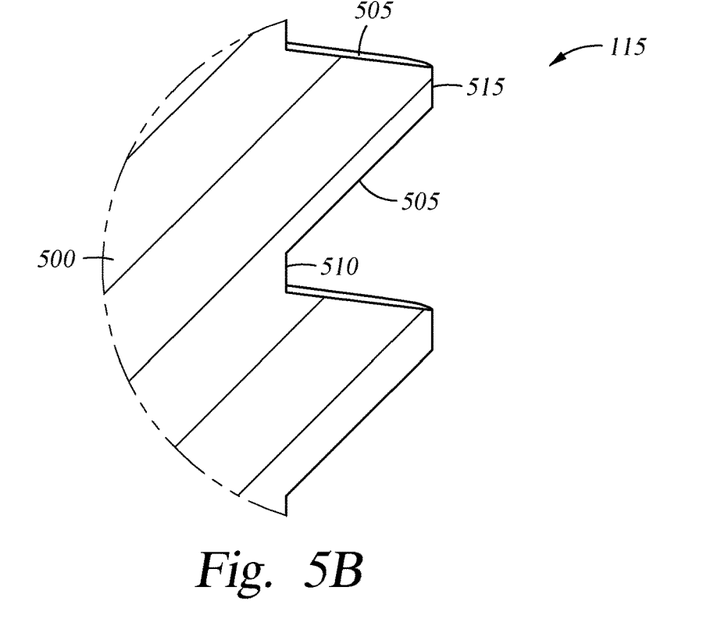

FIG. 5A is a cross-sectional view of a male portion 500 having a male thread form 115 that is an American Buttress thread type. FIG. 5B is an enlarged portion of the cross-sectional view of the male thread form 115 of FIG. 5A. As shown in FIG. 5B, the male thread form 115 includes flanks 505, a flat root 510, and a crest 515. The male thread form 115 of the male portion 500 may be utilized with the female thread form 120 of the female portion 110 to form the threaded connection 100 of FIGS. 1A and 1B. The flanks 505 are planar and are disposed at different angles with respect to a plane of the root 510 and/or the crest 515, and intersect the crest 515.

Figure 6A:
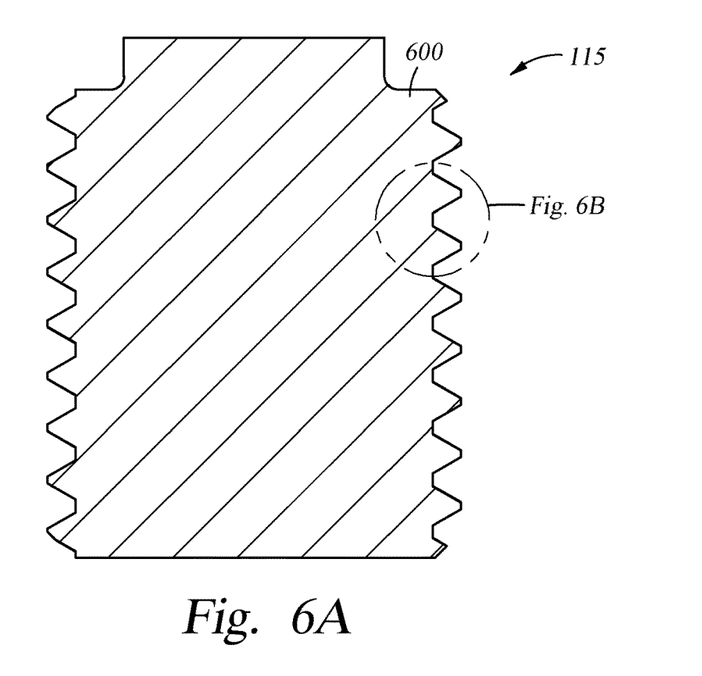
Figure 6B:
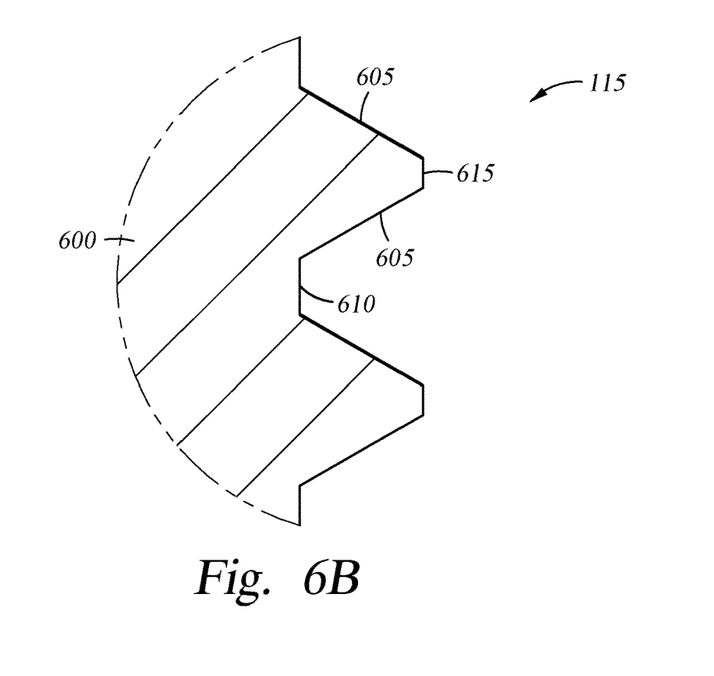

FIG. 6A is a cross-sectional view of a male portion 600 having a male thread form 115 that is a "V" thread type. FIG. 6B is an enlarged portion of the cross-sectional view of the male thread form 115 of FIG. 6A. As shown in FIG. 6B, the male thread form 115 includes flanks 605, a flat root 610, and a crest 615. The male thread form 115 of the male portion 600 may be utilized with the female thread form 120 of the female portion 110 to form the threaded connection 100 of FIGS. 1A and 1B. The flanks 605 are disposed at the same angle with respect to a plane of the root 610 and/or the crest 615, and intersect the crest 615.

Additionally, while a modification of the female thread form 120 was exemplarily described, the male thread form 115 may be modified similarly and used with conventional female thread forms.

While the foregoing is directed to embodiments of the disclosure, other and further embodiments of the disclosure thus may be devised without departing from the basic scope thereof, and the scope thereof is determined by the claims that follow.

The invention claimed is:

1. A thread form for a threaded connection, the thread form comprising:
a threaded member having a plurality of threads extending from a first end to a second end, wherein at least a portion of each of the threads include a crest, a root having a root radius that extends from a central point to the root, and planar flanks extending from both sides of the root radius, wherein a diameter of the threads formed by the crests is constant along a length of the threaded member from the first end to the second end, wherein a diameter of the threads formed by the roots is constant along the length of the threaded member from the first end to the second end, and wherein the planar flanks comprise a first flank and a second flank, the first flank disposed at a first angle relative to the crest, and the second flank disposed at a second angle relative to the crest that is different than the first angle.

2. The thread form of claim 1, wherein the first angle is greater than the second angle.

3. The thread form of claim 1, wherein the first angle is about 50% greater than the second angle.

4. The thread form of claim 1, wherein the first angle is about 100% greater than the second angle.

5. The thread form of claim 1, wherein the first angle is within a range of about 14 degrees to about 15 degrees.

6. The thread form of claim 1, wherein the first angle is about 14 degrees and the second angle is about 50 degrees.

7. A threaded connection, comprising:
a male threaded member having a plurality of male threads extending from a first end to a second end; and
a female threaded member coupled to the male threaded member and having a plurality of female threads extending from a first end to a second end, wherein the female threads comprise a crest, a root having a root radius that extends from a central point to the root, and planar flanks extending from both sides of the root radius, wherein an inner diameter of the female threaded member formed by the crests of the female threads is constant from the first end to the second end of the female threaded member, wherein an inner diameter of the female threaded member formed by the roots of the female threads is constant from the first end to the second end of the female threaded member, and wherein an edge of a crest of at least one male thread contacts one of the planar flanks of at least one female thread, such that a top of the crest of the male thread does not contact the planar flanks of the female thread, and such that planar flanks of the male thread do not contact the planar flanks of the female thread.

8. The threaded connection of claim 7, wherein the male threads form an Acme thread type.

9. The threaded connection of claim 7, wherein the male threads form an American Buttress thread type.

10. The threaded connection of claim 7, wherein the male threads form a "V" thread type.

11. The threaded connection of claim 7, wherein the planar flanks comprise a first flank and a second flank, the first flank disposed at a first angle, and the second flank disposed at a second angle that is different than the first angle.

12. The threaded connection of claim 11, wherein the first angle is greater than the second angle.

13. The threaded connection of claim 11, wherein the first angle is about 50% greater than the second angle.

14. The threaded connection of claim 11, wherein the first angle is about 100% greater than the second angle.

15. The threaded connection of claim 11, wherein the first angle is within a range of about 14 degrees to about 15 degrees.

16. The threaded connection of claim 11, wherein the first angle is about 14 degrees and the second angle is about 50 degrees.

17. The threaded connection of claim 7, wherein the edge of the crest that contacts the planar flank is a chamfered edge.

* * * * *